United States Patent
Kim

(10) Patent No.: US 12,325,380 B2
(45) Date of Patent: Jun. 10, 2025

(54) METHODS AND SYSTEM FOR DETECTING MISUSE OF SEAT BELTS

(71) Applicants: HYUNDAI MOTOR COMPANY, Seoul (KR); KIA CORPORATION, Seoul (KR)

(72) Inventor: Young Rok Kim, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 248 days.

(21) Appl. No.: 18/120,250

(22) Filed: Mar. 10, 2023

(65) Prior Publication Data

US 2024/0109511 A1     Apr. 4, 2024

(30) Foreign Application Priority Data

Oct. 4, 2022  (KR) .......................... 10-2022-0126368

(51) Int. Cl.
*B60R 22/48* (2006.01)

(52) U.S. Cl.
CPC ........ *B60R 22/48* (2013.01); *B60R 2022/485* (2013.01); *B60R 2022/4866* (2013.01)

(58) Field of Classification Search
CPC .............. B60R 22/48; B60R 2022/485; B60R 2022/4866; B60R 2022/4808; B60R 2022/4816

See application file for complete search history.

(56) References Cited

U.S. PATENT DOCUMENTS

| | | | |
|---|---|---|---|
| 2016/0046261 A1 | 2/2016 | Gulash | |
| 2018/0326944 A1* | 11/2018 | Cech | G06V 20/593 |
| 2020/0172048 A1* | 6/2020 | Jo | B60R 22/48 |
| 2020/0231109 A1* | 7/2020 | Baltaxe | G06N 3/08 |
| 2020/0298794 A1* | 9/2020 | Dingli | G06F 9/3004 |
| 2021/0138999 A1 | 5/2021 | Thomas et al. | |
| 2021/0206344 A1* | 7/2021 | George | B60R 21/01544 |
| 2021/0347323 A1 | 11/2021 | Thomas et al. | |
| 2022/0203930 A1* | 6/2022 | Hu | G06T 7/60 |
| 2022/0398404 A1* | 12/2022 | Chung | G06V 10/143 |
| 2023/0222814 A1* | 7/2023 | Barth | G06V 20/59 382/103 |
| 2023/0339427 A1* | 10/2023 | Bang | B60R 22/26 |

FOREIGN PATENT DOCUMENTS

| | | |
|---|---|---|
| JP | 3821088 B2 | 9/2006 |
| JP | 2006327220 A * | 12/2006 |
| JP | 2018-001908 A | 1/2018 |
| KR | 2013-0017048 A | 2/2013 |
| KR | 2020-0064449 A | 6/2020 |

* cited by examiner

*Primary Examiner* — Ryan W Sherwin
(74) *Attorney, Agent, or Firm* — MCDONNELL BOEHNEN & BERGHOFF LLP

(57) ABSTRACT

A system and a method for detecting misuse of the seat belt includes a sensor unit detecting an occupant seated on a seat and a seat belt and a controller detecting an occupant based on an image signal detected through the sensor unit while the seat belt is fastened, separately detecting a shoulder webbing and a lap webbing of the seat belt, and determining whether the seat belt is worn normally or abnormally based on the detected result to warn that the seat belt is abnormally worn.

18 Claims, 13 Drawing Sheets

<NORMAL FASTENING>

<SHOULDER WEBBING PULLED
UNDER ARMPIT AFTER NORMAL FASTENING>

<SHOULDER WEBBING PULLED BEHIND BACK>

<SITTING ON SEAT BELT AFTER FASTENING>

<ONLY SHOULDER WEBBING PULLED>

<SHOULDER PULLED OUT
AFTER FASTENING SHOULDER WEBBING ONLY>

METHODS AND SYSTEM FOR DETECTING MISUSE OF SEAT BELTS

CROSS REFERENCE TO RELATED APPLICATIONS

The present application claims priority to Korean Patent Application No. 10-2022-0126368, filed Oct. 4, 2022, the entire contents of which is incorporated herein for all purposes by this reference.

BACKGROUND

Field of the Disclosure

The present disclosure relates to a system and a method for detecting misuse of a seat belt to induce proper wear of the seat belt upon determining by image recognition technology that the seat belt is abnormally fastened.

Description of the Related Art

A seat belt must be worn to protect an occupant's body in the event of a car accident.

However, when an occupant does not wear a seat belt or does not wear the seat belt normally, the occupant may not be properly protected in various accident situations.

Therefore, when an occupant does not wear the seat belt normally, it is necessary to induce the occupant to wear the seat belt properly as illustrated in FIG. 1.

For example, as illustrated in FIGS. 2 to 6, when a shoulder webbing is pulled through an armpit or pulled behind the back after wearing the seat belt, when only the shoulder webbing is fastened and the lap webbing is pulled under the legs, or when the seat belt is fastened on an empty seat and an occupant sits on the seat belt, it is necessary to induce proper wear of the seat belt upon determining that the seat belt is abnormally fastened.

Matters described above as background technology are intended only for a better understanding of the background of the present disclosure and are not to be taken as an acknowledgment that they pertain to the conventional art known to those skilled in the art.

SUMMARY

The present disclosure is devised to address the issues described above and aims to provide a system and a method for detecting misuse of a seat belt to induce proper wear of the seat belt upon determining by image recognition technology that the seat belt is abnormally fastened.

According to the present disclosure, the system for detecting misuse of a seat belt includes a sensor unit detecting an occupant seated on a seat and the seat belt and a controller detecting the occupant based on an image signal detected through the sensor unit while the seat belt is fastened, detecting a shoulder webbing and a lap webbing of the seat belt, and determining whether the seat belt is worn normally or abnormally based on a detection result to warn that the seat belt is abnormally worn.

The controller may include an occupant detection unit detecting an occupant's body type and body part and a webbing detection unit individually detecting the shoulder webbing and the lap webbing in a shoulder webbing area and a lap webbing area.

The controller may set the shoulder webbing area and the lap webbing area based on the occupant's body type when the occupant is detected and detect the shoulder webbing area and the lap webbing area only to detect the shoulder webbing and the lap webbing.

When the occupant is detected and the shoulder webbing or the lap webbing is not detected in the shoulder webbing area and the lap webbing area, the controller may determine that the undetected webbing is abnormally worn and output a warning.

When an occupant is detected and the seat belt is normally fastened, the controller may stop detecting the shoulder webbing and the lap webbing and detects the occupant's body part only.

When a motion of an occupant's hand or a movement of the webbing satisfies a misuse condition of the shoulder webbing or the lap webbing after the seat belt is normally fastened whereby the occupant and the shoulder and lap webbings are detected, the controller may individually detect the shoulder webbing and the lap webbing in the shoulder webbing area and the lap webbing area.

When the occupant's hand is raised over the shoulder or the shoulder webbing passes the occupant's face covering the face, the misuse condition of the shoulder webbing may be satisfied.

When the occupant's hand passes after staying around the lap webbing within a specific time range, the misuse condition of the lap webbing may be satisfied.

When no occupant is detected, the controller may stop detecting an occupant, fix the shoulder webbing area and the lap webbing area at the preset positions and detect a preset shoulder webbing area and lap webbing area only to detect the shoulder webbing and the lap webbing.

When no occupant is detected and the shoulder webbing or the lap webbing is detected, the controller may determine that the seat belt is fastened on an empty seat.

When it is determined that the seat belt is fastened on an empty seat, whether a door is open is determined to detect the shoulder webbing and the lap webbing until the door is opened.

When no occupant is detected and neither the shoulder webbing nor the lap webbing is detected, the controller may determine that an object is placed on a seat or that the seat belt is fastened behind the seat.

When no occupant is detected, neither the shoulder webbing nor the lap webbing is detected, and a car seat mounting device is operated, the controller may determine that a car seat is mounted on the seat.

When the occupant is detected and neither the shoulder webbing nor the lap webbing is detected after it is determined that the seat belt is fastened on an empty seat with no occupant thereon, the controller may determine that the occupant is seated on the seat belt or that the seat belt is abnormally fastened behind the seat and output a warning.

The controller may output a warning message or symbol corresponding to the seat belt being abnormally worn on a cluster.

The sensor unit may detect a buckle area of the seat belt to determine whether the seat belt is fastened.

According to the present disclosure, a system for detecting misuse of a seat belt includes a sensor unit detecting an occupant seated on a seat and a seat belt, an occupant detection unit detecting the occupant based on an image signal detected through the sensor unit while the seat belt is fastened, a webbing detection unit detecting the shoulder webbing and the lap webbing of the seat belt based on the image signal detected through the sensor unit while the seat belt is fastened, a wear determination unit determining whether the seat belt is worn normally or abnormally based on the detection results by the occupant detection unit and webbing detection unit, and a warning output unit outputting a warning that the seat belt is abnormally worn.

A method of detecting misuse of a seat belt includes detecting, by a sensor unit, an occupant seated on a seat and a seat belt, detecting by a controller the occupant based on an image signal detected through the sensor while the seat belt is fastened, separately detecting, by the controller, a shoulder webbing and a lap webbing of the seat belt based on the image signal detected through the sensor while the seat belt is fastened, determining, by the controller, whether the seat belt is worn normally or abnormally based on the detection results in the occupant detecting and webbing detecting, and outputting, by the controller, a warning that the seat belt is abnormally worn.

According to the present disclosure for resolving the issues described above, that the shoulder webbing or the lap webbing is covered or is not normally fastened is accurately determined and a warning is outputted by separately determining the shoulder webbing and the lap webbing along with the presence or absence of an occupant by the image recognition technology, thereby having the effect of inducing the occupant to properly wear the seat belt.

Further, selectively operating the algorithms of the occupant detection unit and the webbing detection unit in accordance with the driving situation of the vehicle without operating the algorithm unrequired for the current driving situation saves hardware resources used for program executions and alleviates the burden on the hardware such as a processor, memory, and the like, thereby having an advantage in reducing the costs with optimized specifications.

DETAILED DESCRIPTION

Figure 1:
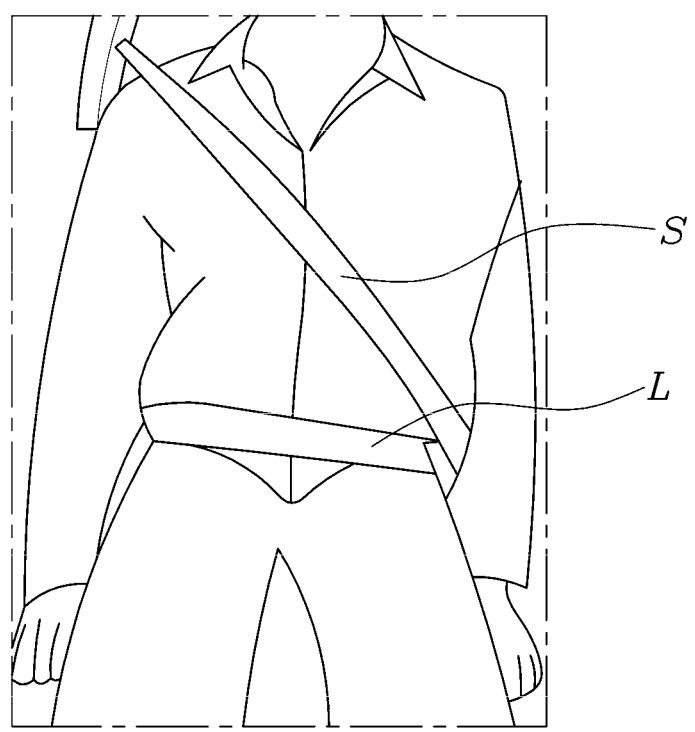
FIG. 1 is a view illustrating a state in which a seat belt is normally worn.
Figure 2:
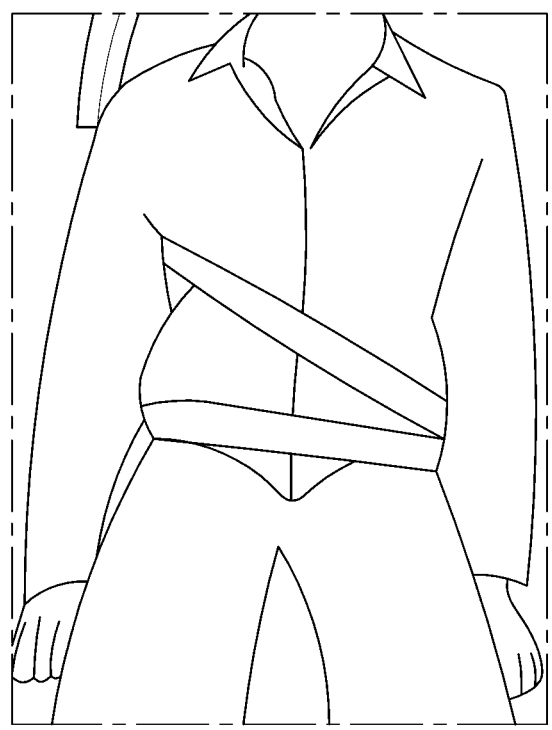
FIGS. 2, 3, 4, 5, and 6 are views illustrating states in which a seat belt is abnormally worn.
Figure 3:
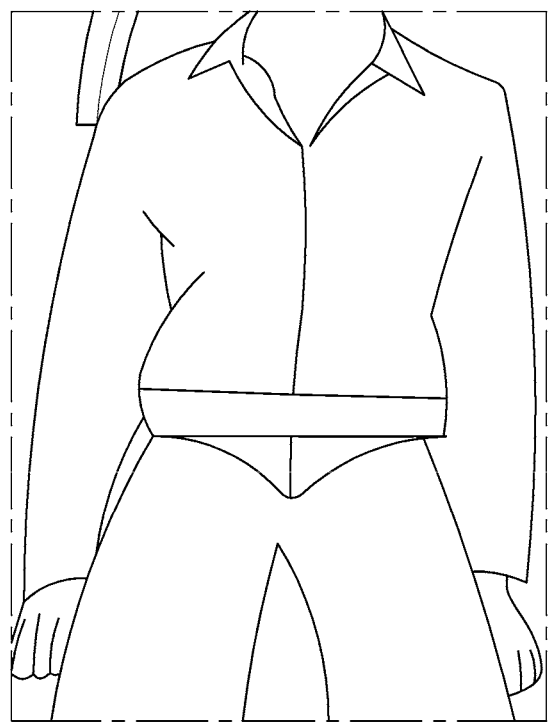
Figure 4:
Figure 5:
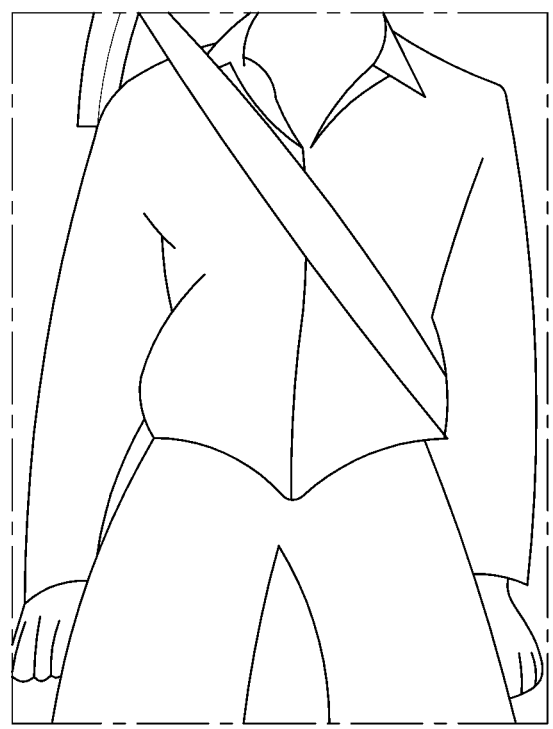
Figure 6:
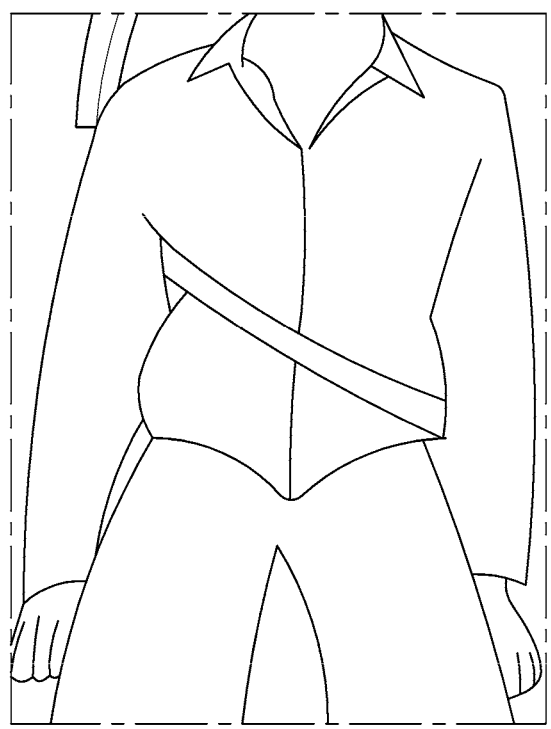

The embodiment disclosed in the present specification will be described in detail with reference to the accompanying drawings. However, the same or similar components will be given the same reference numerals irrespective of the drawing numbers, and the repetitive descriptions will be omitted.

The suffixes "module" and "unit" for the components used in the following description are given or interchangeably used only in consideration of the ease of writing the specification and do not have meanings or roles distinct from each other by themselves.

When it is determined that the specific description of the related and already known technology may obscure the gist of the embodiments disclosed in the specification, the specific description will be omitted. Further, it is to be understood that the accompanying drawings are for a better understanding of the embodiments disclosed in the present specification and that the technical ideas disclosed in the present specification are not limited by the accompanying drawings and include all the modifications, equivalents, or substitutes included in the spirit and technical scope of the present disclosure.

The terms including ordinal numbers such as first, second, and the like may be used to describe various components, but the components are not to be limited by the terms. The terms may only be used for the purpose of distinguishing one component from the other.

It is to be understood that when a component is referred to as being "connected" or "coupled" to another component, the component may be directly connected or coupled to another component, but other components may be interposed therebetween. In contrast, when a component is referred to as being "directly connected" or "directly coupled" to another component, it is to be understood that there is no component interposed therebetween.

Singular expressions include plural expressions unless the context explicitly indicates otherwise.

In the present specification, terms such as "comprise" or "have" are intended to indicate the presence of implemented features, numbers, steps, manipulations, components, parts, or combinations thereof described in the specification and are not to be understood to preclude the presence or additional possibilities of one or more of other features, numbers, steps, manipulations, components, parts or combinations thereof in advance.

A controller may include a communication device communicating with other controllers or sensors to control the functions it is responsible for, a memory storing an operating system, logic commands, and input/output information, and one or more processors executing determination, calculation, and decision, and the like required for controlling the functions it is responsible for.

Figure 7:
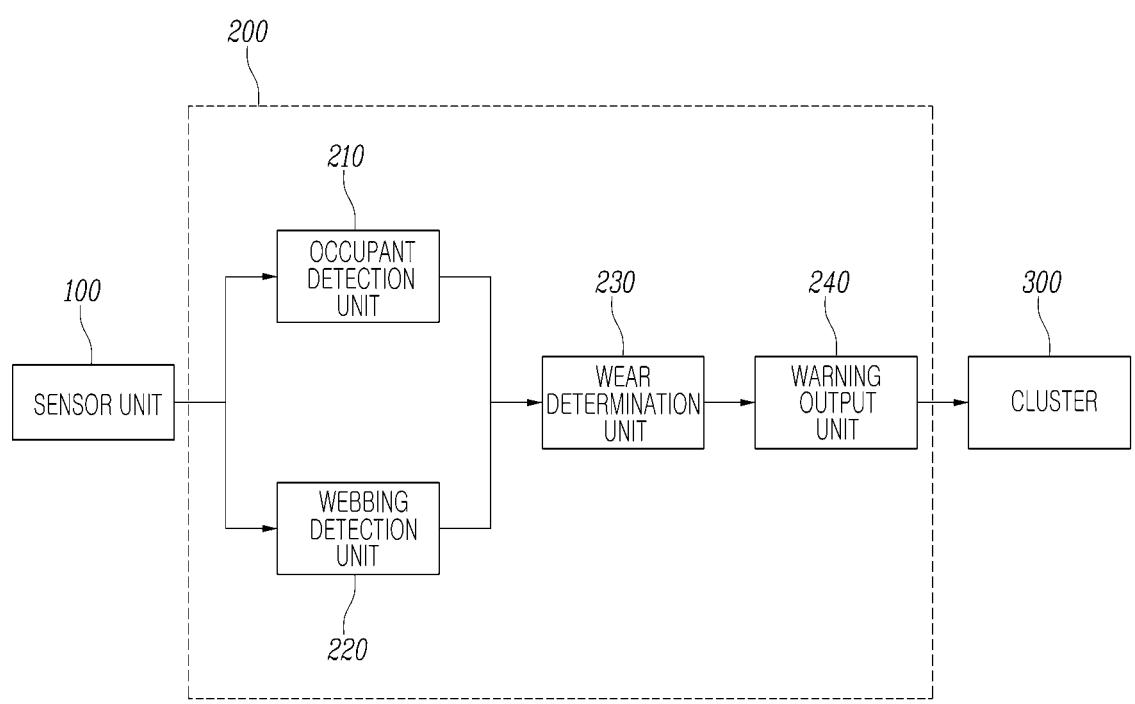
FIG. 7 is a view illustrating a system for detecting seat belt misuse according to the present disclosure.

FIG. 7 is a view illustrating a system for detecting seat belt misuse according to the present disclosure.

FIGS. 1 to 7 show that the system for detecting seat belt misuse includes a sensor unit 100 detecting an occupant seated on a seat and a seat belt and a controller 200 detecting the occupant based on an image signal detected through the detecting unit 100 while the seat belt is fastened, separately detecting a shoulder webbing S and a lap webbing L, and determining whether the seat belt is worn normally or abnormally based on the detection result to warn that the seat belt is abnormally worn.

For example, the sensor unit 100 may be a vision sensor detecting IR (infrared) and RGB (color) and is installed inside the vehicle to detect an occupant and a seat belt.

Figure 8:
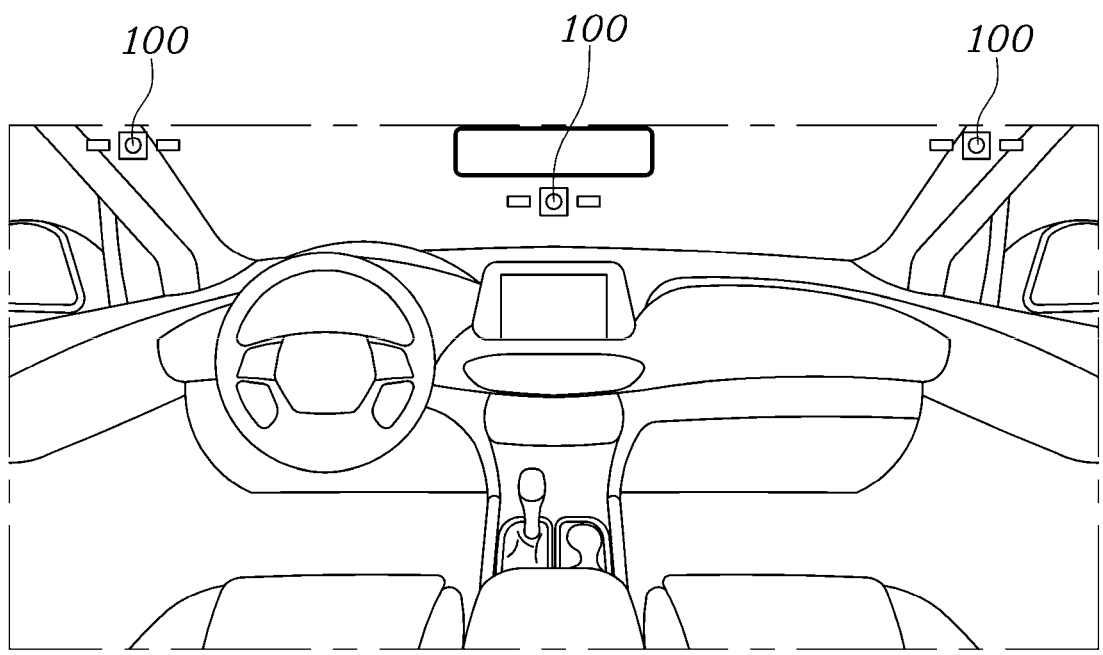
FIG. 8 is a view illustrating the mounting positions of sensors according to the present disclosure.

At least one or more of the sensor units 100 need to be installed. When one sensor unit 100 is installed, the sensor unit 100 may be installed at the front center of the roof or upper center of the windshield glass as shown in FIG. 8. When two sensor units 100 are installed, the sensor units 100 may be installed on either side in the front of the roof.

An occupant divide system (ODS) may be additionally employed as a device for detecting the occupant or may be employed as a replacement for other image determination algorithms.

Further, the sensor unit 100 may detect a buckle area of the seat belt to determine whether the seat belt is fastened.

However, an image algorithm other than the sensor unit 100 may be employed to determine whether the seat belt is fastened.

A buckle sensor or a buckle switch may be employed as an alternative device to determine whether the seat belt is fastened, or a seat belt reminder (SBR) matt recognizing an occupant seated on a seat and determining whether the seat belt is worn may be employed.

In addition, the controller 200 may be an integrated image controller processing images detected by the sensor unit 100.

As illustrated in FIG. 7, the controller 200 preferably includes an occupant detection unit 210 detecting the occupant's body type and body part and a webbing detection unit 220 individually detecting the shoulder webbing S and the lap webbing L in a shoulder webbing area SA and a lap webbing area LA.

In addition, the controller 200 may further include a wear determination unit 230 determining whether the seat belt is worn normally or abnormally based on the determination results by the occupant detection unit 210 and the webbing detection unit 220 and a warning output unit 240 warning that a seat belt is abnormally worn.

Specifically, the occupant detection unit 210 may detect the occupant's body type and body parts through an AI-based image recognition algorithm to detect each part of the occupant's body as well as detect boarding or non-boarding of the occupant.

Figure 9:
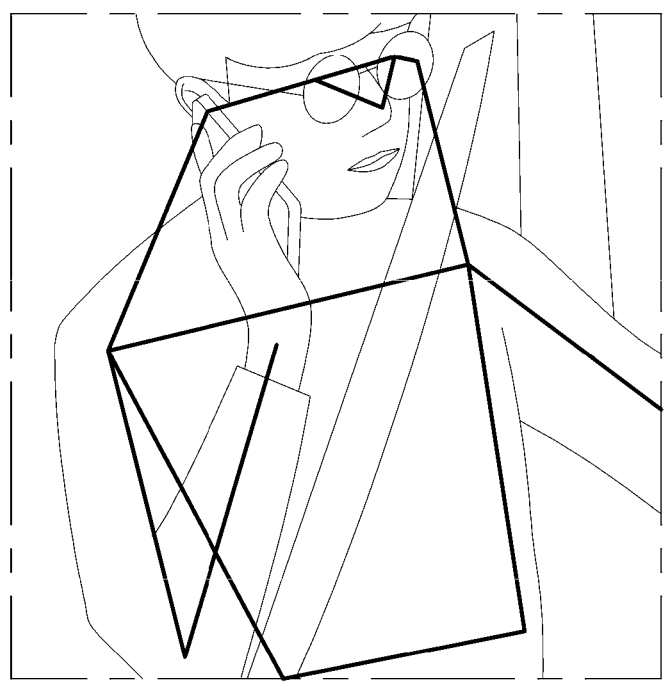
FIG. 9 is a view illustrating an occupant detection operation according to the present disclosure.

For example, FIG. 9 is a view illustrating an occupant detection operation, and the occupant may be detected using skeleton-based body key point technology.

In addition, the webbing detection unit 220 may separately detect the shoulder webbing S covering the shoulder portion and the lap webbing L covering the abdomen portion of the seat belt by image recognition technology based on artificial intelligence (AI).

Figure 10:
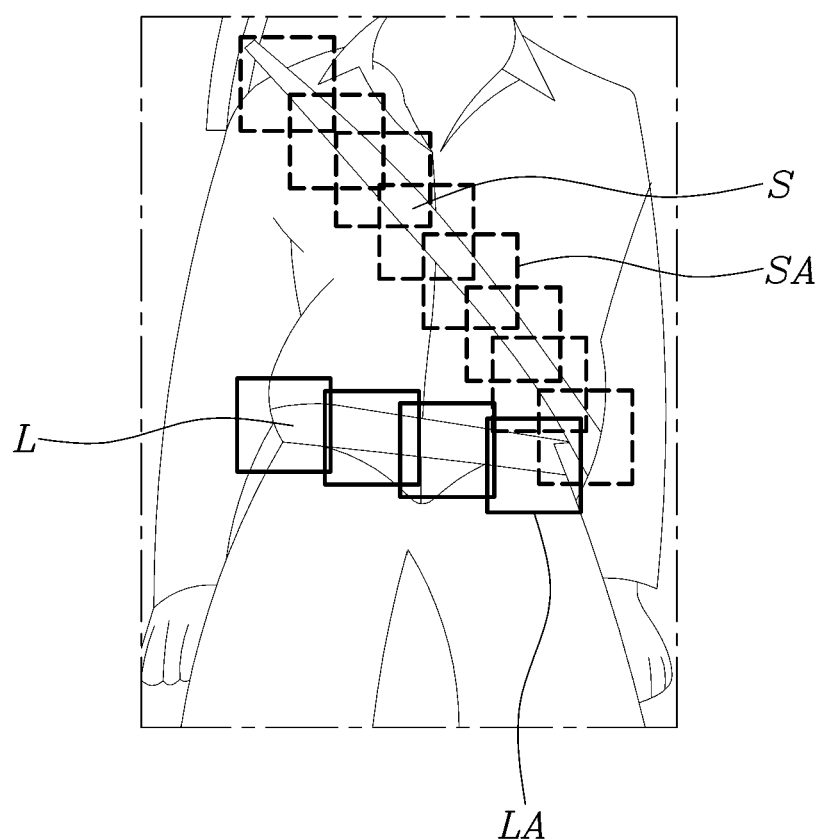
FIG. 10 is a view illustrating a separate seat belt detection operation according to the present disclosure.

For example, FIG. 10 is a view illustrating a separate detection operation of a seat belt, and the shoulder webbing S and the lap webbing L are detected by detecting the shoulder webbing area SA and the lap webbing area LA only.

Preferably, separate webbing detection units 220 may be provided for separate detection of the shoulder webbing S and the lap webbing L, or one webbing detection unit may separately detect the shoulder webbing S and the lap webbing L in the detected seat belt.

It is to be noted that the occupant detection unit 210 and the webbing detection unit 220 may be included in the controller 200 or may also be provided in the form of separate hardware.

That is, that the shoulder webbing S or the lap webbing L is covered or abnormally fastened is accurately determined and a warning is output by separately determining the shoulder webbing S and the lap webbing L along with the presence or absence of an occupant by the image recognition technology, thereby having the effect of inducing the occupant to properly wear the seat belt.

On the other hand, when the occupant is detected, the controller 200 may set the shoulder webbing area SA and the lap webbing area LA and detect the shoulder webbing S and the lap webbing L by detecting the set shoulder webbing area SA and the lap webbing area LA only.

That is, when the occupant's body type is detected through the occupant detection unit 210, the webbing detection unit 220 sets the positions of the shoulder webbing area SA and the lap webbing area LA associated with the occupant's body type assuming that the seat belt is abnormally worn and separately detects the shoulder webbing S and the lap webbing L in the set shoulder webbing area SA and the lap webbing area LA.

In addition, when the occupant is detected and the shoulder webbing S or the lap webbing L is not detected in the shoulder webbing area SA and the lap webbing area LA, the controller 200 may determine that the undetected webbing is abnormally worn and output a warning.

Figure 12:
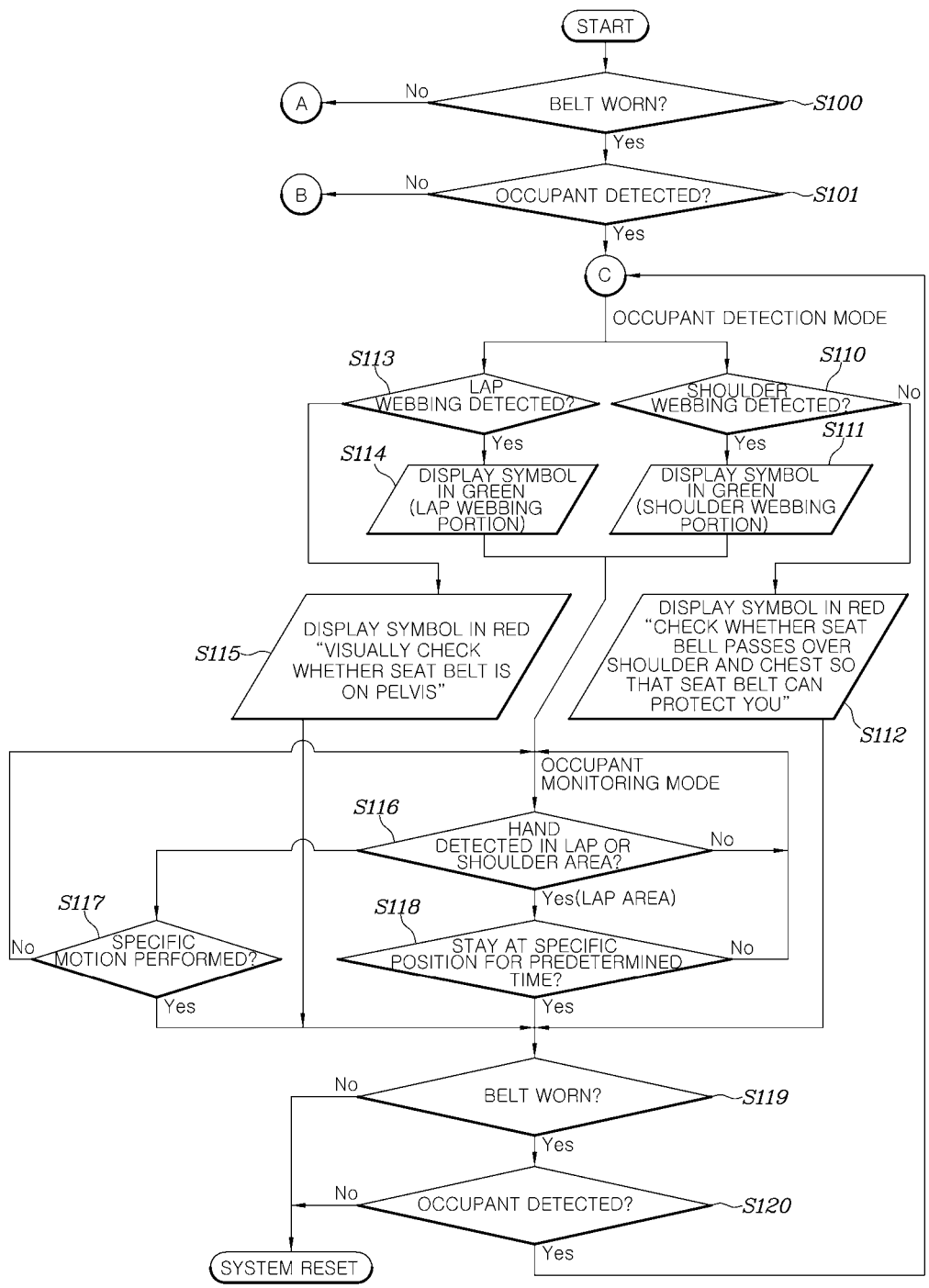
FIGS. 12 and 13 are flowcharts of exemplary processes of detecting seat belt misuse according to the present disclosure.
Figure 13:
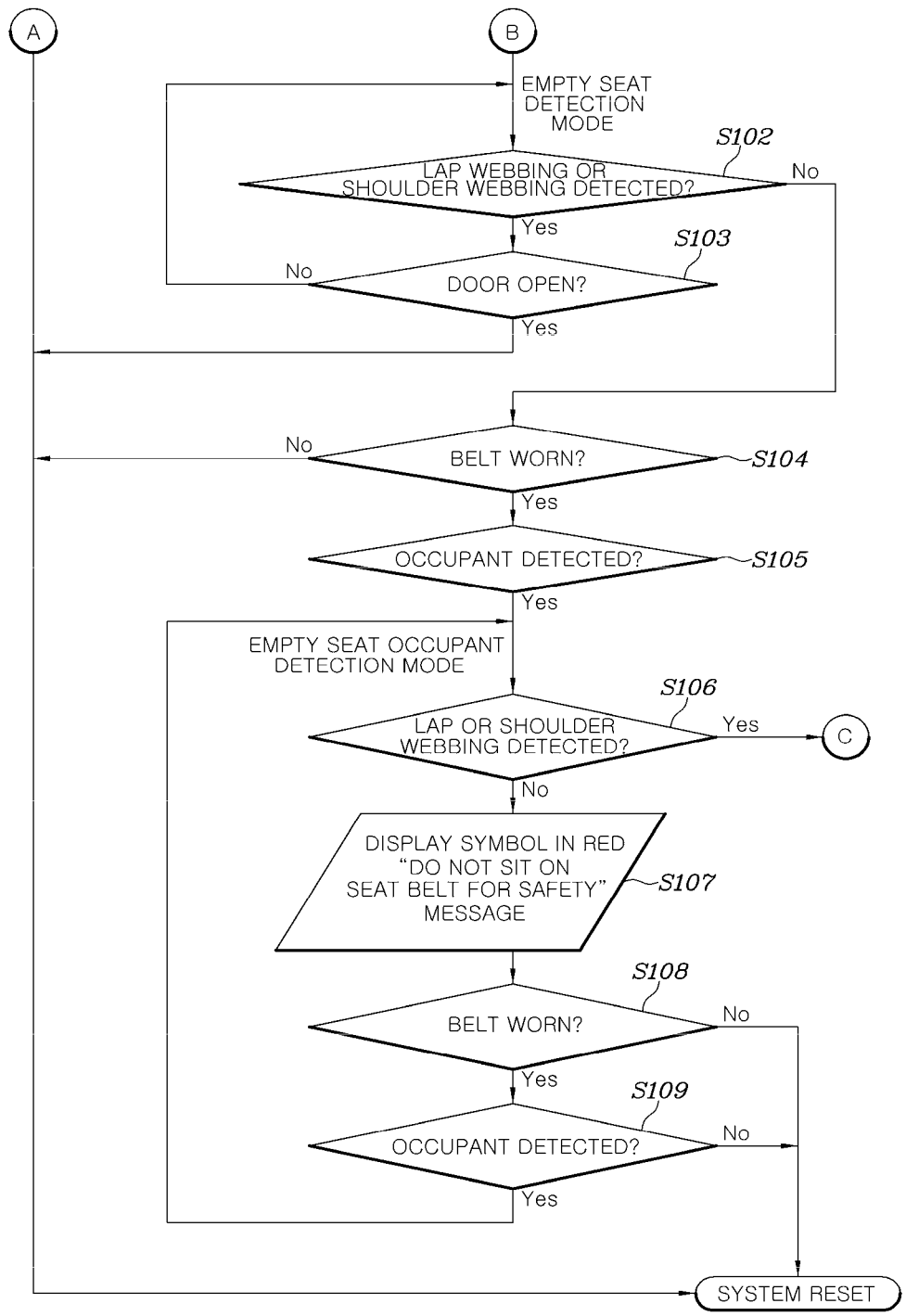

FIGS. 12 and 13 show that an occupant detection mode in which whether the occupant properly wears the seat belt is determined is entered when the seat belt is worn and the occupant is detected.

When the occupant detection mode is entered, the shoulder webbing and the lap webbing are detected in the shoulder webbing area SA and the lap webbing area LA.

When no webbing is detected in the shoulder webbing area SA or the lap webbing area LA, the occupant is informed that the undetected webbing is not normally worn so that the occupant may check the seat belt, and thus proper wear of the seat belt is induced.

On the other hand, when an occupant is detected and the seat belt is normally fastened, the controller 200 stops detecting the shoulder webbing S and the lap webbing L and detects the occupant's body part only. The occupant's body part refers to the occupant's hand moving in an attempt to misuse the webbing.

That is, the situation in which driving is performed with the seat belt normally fastened is one of the situations in which the driving last for the longest time.

Stopping the operation of the webbing detection unit 220 while the car drive lasts for a long time in this manner and operating the occupant detection unit 210 under the current driving situation without operating the algorithm of the webbing detection unit 220 unrequired for the current driving situation save hardware resources used for program executions and alleviate the burden on the hardware such as a processor, memory, and the like, thereby reducing the costs with optimized specifications.

In addition, when an occupant's hand motion or a movement of the webbing satisfies a misuse condition of the shoulder webbing S or the lap webbing L after the seat belt is normally fastened whereby the occupant is detected and the shoulder webbing S and the lap webbing L are detected, the controller 200 may individually detect the shoulder webbing S and the lap webbing L in the shoulder webbing area or the lap webbing area A.

FIGS. 12 and 13 show that an occupant monitoring mode in which an attempt by the occupant to misuse webbing with hands is detected is entered when the occupant wears the seat belt normally.

When the occupant monitoring mode is entered, movements of a hand are tracked so that misuse of the seat belt may be detected if the hand movements satisfy the misuse condition.

Further, when detected movements of webbing satisfy the misuse condition, seat belt misuse may be detected.

Specifically, when an occupant's hand is raised over a shoulder or the shoulder webbing passes the occupant's face covering the face, the misuse condition of the shoulder webbing S may be satisfied.

That is, the occupant's hand is necessarily raised over the shoulder and the shoulder webbing S necessarily passes in front of the occupant's face to pull the shoulder webbing S behind the back completely.

Accordingly, since it is necessary to check whether the occupant misuses the shoulder webbing S when the occupant's hand is raised over the shoulder or the shoulder webbing S passes the face covering the face, the occupant detection mode in which whether the occupant is properly wearing the seat belt is determined is entered again.

In addition, when the occupant's hand passes after staying around the lap webbing L within a specific time range, the misuse condition of the lap webbing L may be satisfied.

That is, when the occupant naturally puts down his/her hand on the lap webbing, the occupant's hand is naturally placed thereon if the hand stays on the lap webbing L for a long time, and the hand hardly moves over a short time like a second or two without an intention to misuse the lap webbing L.

Thus, pulling out the webbing behind the legs within a short time precedes an attempt to misuse the lap webbing L.

Accordingly, since it is necessary to check whether the occupant misuses the lap webbing L when the occupant's hand passes after staying around the lap webbing L for a short time, the occupant detection mode in which whether the occupant is properly wearing the seat belt is determined is entered again.

On the other hand, when no occupant is detected, the controller 200 may stop detecting a passenger, fix the shoulder webbing area SA and the lap webbing area LA at predetermined positions, and detect the preset shoulder webbing area SA and the lap webbing area LA only to detect the shoulder webbing S and the lap webbing L.

That is, when no occupant is detected while the seat belt is fastened, it may be determined that the seat belt is fastened on an empty seat with no occupant thereon.

When a seat belt is only fastened on an empty seat in this way, the seat belt is always positioned at the same portion such that the positions of the shoulder webbing area SA and the lap webbing area LA are always fixed unlike the shoulder webbing position SA and the lap webbing area LA that change depending according to the occupant's body type.

Accordingly, stopping the operation of the occupant detection unit 210 detecting an occupant and operating the webbing detection unit 220 only without operating the algorithm of the occupant detection unit 210 unrequired for the current driving situation may save hardware sources used for program executions and alleviate the burden on the hardware such as a processor, memory, and the like.

In addition, when no occupant is detected and the shoulder webbing S or the lap webbing L is detected, the controller 200 may determine that the seat belt is fastened on an empty seat.

That is, when the seat belt is fastened and the seat is empty with no occupant thereon, an empty seat detection mode in which whether a webbing is detected in the shoulder webbing area SA and the lap webbing area LA is entered.

When it is determined that the seat belt is fastened on the empty seat, whether a door is open may be determined to detect the shoulder webbing S and the lap webbing L until the door is opened.

That is, if the door next to the empty seat is not open while the seat belt is fastened on the empty seat, whether the shoulder webbing S and the lap webbing L are detected is checked again.

In addition, when no occupant is detected and neither the shoulder webbing S and nor the lap webbing L is detected, the controller 200 may determine that an object is placed on the seat or that the seat belt is fastened behind the seat.

That is, if no seat belt is detected in the empty seat detection mode, it is determined that an object covers the seat belt or that the seat belt is fastened behind the seat abnormally.

Further, when no occupant is detected, neither shoulder webbing S nor the lap webbing L is detected, and a car seat mounting device is operated, the controller 200 may determine that a car seat is installed on the seat.

At this time, the car seat mounting device may be an automatic locking retractor (ALR) switch activated when the ALR function is executed.

The ALR function is a function ensuring that the seat belt, once pulled out completely, is only retracted without coming loose in between, and the seat belt, once retracted completely and reset, may be pulled out again.

That is, when the ALR switch is turned on while an object is placed on the seat, it may be presumed that the ALR function is activated for mounting a car seat so that it may be determined that the object on the seat is a car seat. When the ALR switch is not turned on, it may be determined that the object is an ordinary object.

On the other hand, when an occupant is detected and neither the shoulder webbing S nor the lap webbing L is detected after it is determined that the seat belt is fastened on an empty seat with no occupant thereon, the controller 200 may determine that the occupant is seated on the seat belt or that the seat belt is abnormally worn behind the seat and output a warning.

That is, when an occupant is detected in the empty seat detection mode, the empty seat occupant detection mode is entered.

Once the empty seat occupant detection mode is entered, whether the shoulder webbing S and the lap webbing L are detected in the shoulder webbing area SA and the lap webbing area LA set according to the occupant's body type.

When even a portion of webbing is detected in the shoulder webbing area SA and the lap webbing area LA, the occupant detection mode is entered.

In contrast, when no webbing is detected in the shoulder webbing area SA and the lap webbing area LA, and the seat belt is pulled behind the seat or the seat belt is completely covered by an occupant, the occupant is informed that the seat belt is not normally worn and is induced to properly wear the seat belt.

In addition, according to the present disclosure, the controller 200 may display a message or a symbol corresponding to the seat belt being abnormally worn on a cluster 300 for warning.

When the wear determination unit 230 determines that the seat belt is abnormally worn, the warning output unit 240 displays a warning message or symbol corresponding to the seat belt being abnormally worn on the cluster 300.

For example, when no shoulder webbing S is detected in the occupant detection mode, a shoulder webbing S portion of the symbol image for seat belt wear lit up on the cluster 300 flashes in red.

A warning message for inducing a check on whether the shoulder webbing S is properly worn is displayed on the cluster 300.

In addition, when no lap webbing L is detected in the occupant detection mode, a lap webbing L portion of the symbol image for seat belt wear lit up on the cluster 300 flashes in red.

A warning messing inducing a check on whether the lap webbing L is worn properly is displayed on the cluster 300.

It is to be noted that the warning message displayed on the cluster 300 needs to appropriately guide the occupant in the direction of checking the seat belt himself so as not to give the impression that the occupant is being monitored by the vision sensor and that the seat belt is preferably exposed to the vision sensor to this end.

Another method of inducing the normal wear of the seat belt is to introduce a motion for encouraging the normal wear of the seat belt.

In addition, when neither the shoulder webbing S nor the lap webbing L is detected in the empty seat occupant detection mode, the symbol for seat belt wear flashes in red.

A warning message not to pull the seat belt behind the seat or a warning message not to sit on the seat belt is displayed on the cluster 300.

Figure 11:
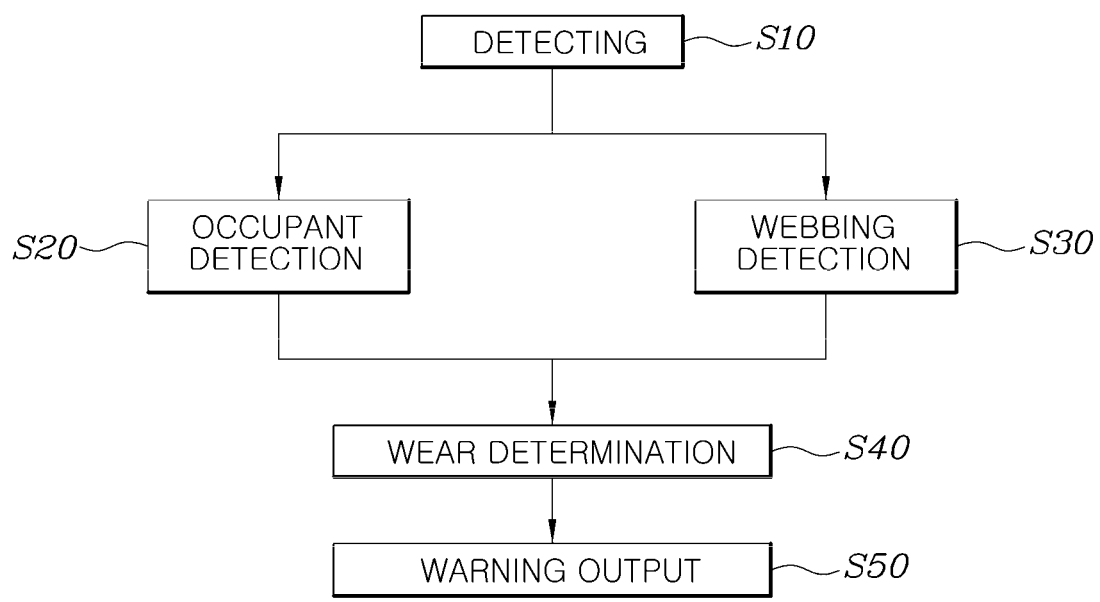
FIG. 11 is a block diagram sequentially listing a method of detecting seat belt misuse according to the present disclosure.

On the other hand, FIG. 11 is a block diagram sequentially listing a sequence a method of detecting seat belt misuse according to the present disclosure.

The diagram shows that the method of detecting seat belt misuse includes detecting by the sensor unit 100 an occupant seated on a seat and a seat belt at S10, detecting by the controller 200 the occupant based on an image signal detected through the sensor unit 100 while a seat belt is fastened at S20, separately detecting by the controller 200 a shoulder webbing S and a lap webbing L of the seat based on an image signal detected through the sensor unit 100 while the seat belt is fastened at S30, determining by the controller 200 whether the seat belt is worn normally or abnormally based on detection results in the occupant determination and the webbing determination at S40, and outputting by the controller 200 a warning that the seat belt is abnormally worn at S50.

An example of a control process for detecting misuse of the seat belt according to the present disclosure will be described in the following.

FIGS. 12 and 13 show that whether the seat belt is fastened is first determined at S100.

Whether the seat belt is fastened is detected by detecting the buckle area or using a buckle sensor/buckle switch.

The detecting system of the present disclosure is reset and restarted to save the hardware resources when it is determined that the seat belt is unfastened, and the SBR logic is activated to monitor the fastening and unfastening of the seat belt when the seat belt remains unfastened.

In contrast, when it is determined that the seat belt is fastened, whether the occupant is detected is checked through the occupant detection unit 210 at S101.

When no occupant is detected, the empty seat detection mode is entered to determine whether the shoulder webbing S or the lap webbing L is detected at S102.

When the shoulder webbing S or the lap webbing L is detected in S102, whether a door is open is determined at S103.

Since the detection of the seat belt with no occupant detected may warrant a presumption that the seat belt is fastened on an empty seat, step S102 is reentered to determine whether the shoulder webbing S or the lap webbing L is detected again when the door is not opened, and the detection system is reset and restarted when the door is opened.

When the shoulder webbing S or the lap webbing L is not detected in S102, whether the seat belt is fastened is determined at S104.

The detection system is reset and restarted when it is determined that the seat belt is unfastened in S104, and whether an occupant is detected is checked when it is determined that the seat belt is fastened at S105.

When no occupant is detected in S105, S102 is reentered.

In contrast, when an occupant is detected, the empty seat occupant detection mode is entered to determine whether the shoulder webbing S or the lap webbing L is detected at S106.

When neither the shoulder webbing nor the lap webbing L is detected in S106, the seat belt wear symbol is displayed in red, and a warning message not to sit on the seat belt or a warning message not to pull the seat belt behind the seat is displayed at S107.

Whether the seat belt is fastened is determined after the warning at S108.

When it is determined that the seat belt is unfastened in S108, the detection system is reset and restarted, and whether an occupant is detected is checked when it is determined that the seat belt is fastened at S109.

The detection system is reset and restarted when no occupant is detected in S109, and step S106 is reentered to determine whether the shoulder webbing S or the lap webbing L is detected when an occupant is detected.

In contrast, when even a portion of the shoulder webbing S or the lap webbing L is detected in S106, the occupant detection mode is entered and whether the shoulder webbing S or the lap webbing L is detected is determined.

When no shoulder webbing S is detected in S110, it is determined that the shoulder webbing S is abnormally worn, the shoulder webbing S portion of the seat belt wear symbol image is displayed in red, and a warning message for inducing the occupant to check whether the shoulder webbing S is properly worn is displayed at S112.

In addition, when no lap webbing is detected in S113, it is determined that the lap webbing is abnormally worn, the lap webbing L portion of the seat belt wear symbol image is displayed in red, and a warning message for inducing the occupant to check whether the lap webbing L is worn properly is displayed at S115.

Whether the seat belt is fastened is determined after the warnings are displayed in S112 and S115.

The detection system is reset and restarted when it is determined that the seat belt is unfastened in S119 and whether an occupant is detected is checked when it is determined that the seat belt is fastened at S120.

The detection system is reset and restarted when no occupant is detected in S120, and S110 and S113 are reentered to determine whether the shoulder webbing S or the lap webbing L is detected is determined again when an occupant is detected.

In contrast, when the shoulder webbing S is detected in S110, it is determined that the shoulder webbing is normally worn and the shoulder webbing portion of the seat belt wear symbol image is displayed in green.

And, when the lap webbing L is detected in S113, it is determined that the lap webbing L is normally worn, and the lap webbing portion of the seat belt wear symbol image is displayed in green.

Subsequently, the occupant monitoring mode is entered after S111 and S114 and whether an occupant's hand is detected in the shoulder webbing area SA or the lap webbing area LA is determined at S116.

When no occupant's hand is detected in the shoulder webbing area SA or the lap webbing area LA in S116, whether an occupant's hand is detected in the shoulder webbing area SA or the lap webbing area LA is checked again.

In contrast, when an occupant's hand is detected in the shoulder webbing area SA in S116, the hand movement is tracked to determine whether the hand movement is a hand motion for misuse of the shoulder webbing at S117.

When it is determined that the hand movement is not a hand motion for misuse of the shoulder webbing S in S117, S116 is entered to determine whether an occupant's hand is detected in the shoulder webbing area SA or the lap webbing area LA.

In contrast, when it is determined that the hand movement is a hand motion for misuse of the shoulder webbing S in S117, whether the seat belt is fastened is determined at S119.

The detection system is reset and restarted when it is determined that the seat belt is unfastened in S119, and whether an occupant is detected is checked at S120 when it is determined that the seat belt is fastened.

The detection system is reset and restarted when no occupant is detected in S120, and S110 and S113 are reentered to determine whether the shoulder webbing or the lap webbing is detected is determined again when an occupant is detected.

In addition, when an occupant's hand is detected in the lap webbing area LA in S116, the hand movement is tracked to determine whether the occupant's hand passes after staying in the lap webbing area LA within a specific time range at S118.

When the occupant's hand does not pass after staying within the specific time range in S118, S116 is entered to determine whether the occupant's hand is detected in the shoulder webbing area SA or the lap webbing area LA.

In contrast, when the occupant's hand passes after staying within the specific time range in S118, whether the seat belt is fastened is determined at S119.

The detection system is reset and restarted when it is determined that the seat belt is unfastened in S119, and, whether an occupant is detected is checked when it is determined that the seat belt is fastened at S120.

The detection system is reset and restarted when no occupant is detected in S120, and S110 and S113 are reentered to determine whether the shoulder webbing S or the lap webbing L is detected again when an occupant is detected.

In addition, when an occupant's hand is detected in the lap webbing area LA in S116, the hand movement is tracked to determine whether the hand movement is for misuse of the shoulder webbing S at S117.

When it is determined that the hand movement is a hand motion for misuse of the shoulder webbing S in S117, whether the seat belt is fastened is determined at S119.

The detection system is reset and restarted when it is determined that the seat belt is unfastened in S119, and whether an occupant is detected is checked when it is determined that the seat belt is fastened at S120.

The detection system is reset and restarted when no occupant is detected in S120, and S110 and S113 are reentered to determine whether the shoulder webbing S or the lap webbing L is detected is determined again when an occupant is detected.

As described above, according to the present disclosure, that the shoulder webbing S or the lap webbing L is covered or abnormally fastened is accurately determined and a warning is output by separately determining the shoulder webbing S and the lap webbing L along with the presence or absence of an occupant by the image recognition technology, thereby having the effect of inducing the occupant to properly wear the seat belt.

Further, selectively operating the algorithm of the occupant detection unit 210 and the webbing detection unit 220 under the driving circumstance of the vehicle without operating the algorithm unrequired for the current driving situation saves hardware resources used for program executions and alleviates the burden on the hardware such as a processor, memory, and the like, thereby reducing the costs with optimized specifications.

Only specific examples of the present disclosure have been described above in detail, but it is apparent to those skilled in the art that various modifications and revisions may be made within the scope of the technical spirit of the present disclosure and such modifications and revisions naturally fall within the appended claims.

The invention claimed is:

1. A system for detecting misuse of a seat belt, the system comprising:
   a sensor unit configured to detect an occupant seated on a seat and the seat belt; and
   a controller configured to detect the occupant based on an image signal detected through the sensor unit while the seat belt is fastened, to separately detect a shoulder webbing and a lap webbing of the seat belt, and to determine whether the seat belt is worn normally or abnormally based on the detected result to warn that the seat belt is abnormally worn;
   wherein the controller is configured to stop detecting the shoulder webbing and the lap webbing, and to detect an occupant's body part only when the occupant is detected and the seatbelt is normally fastened.

2. The system of claim 1, wherein the controller comprises:
   an occupant detection unit configured to detect the occupant's body type and body part; and
   a webbing detection unit configured to individually detect the shoulder webbing and the lap webbing in a shoulder webbing area and a lap webbing area.

3. The system of claim 2, wherein the controller further includes:
   a wear determination unit configured to determine whether the seat belt is worn normally or abnormally based on the detection result of the occupant detection unit and webbing detection unit; and
   a warning output unit configured to output a warning that the seat belt is abnormally worn.

4. The system of claim 1, wherein the controller is configured to set a shoulder webbing area and a lap webbing area based on the occupant's body type when the occupant is detected, and to detect the shoulder webbing area and the lap webbing area only to detect the shoulder webbing and the lap webbing.

5. The system of claim 1, wherein the controller is configured to determine that an undetected webbing is abnormally worn, and to output a warning when the occupant is detected and the shoulder webbing or the lap webbing is not detected in a shoulder webbing area and a lap webbing area.

6. The system of claim 1, wherein when no occupant is detected, the controller is configured to stop detecting the occupant, to fix the shoulder webbing area and the lap webbing area to preset positions, and to detect a preset shoulder webbing area and lap webbing area only to detect the shoulder webbing and the lap webbing.

7. The system of claim 1, wherein the controller is configured to determine that an object is placed on the seat or the seat belt is fastened behind the seat when no occupant is detected and neither the shoulder webbing nor the lap webbing is detected.

8. The system of claim 1, wherein the controller is configured to determine that a car seat is mounted on the seat when no occupant is detected, neither the shoulder webbing nor the lap webbing is detected, and a car seat mounting device is operated.

9. The system of claim 1, wherein the controller is configured to output a warning message or symbol corresponding to the seat belt being abnormally worn on a cluster.

10. The system of claim 1, wherein the sensor unit is configured to detect a buckle area of the seat belt to determine whether the seat belt is fastened.

11. A system for detecting misuse of a seat belt, the system comprising:
- a sensor unit configured to detect an occupant seated on a seat and the seat belt; and
- a controller configured to detect the occupant based on an image signal detected through the sensor unit while the seat belt is fastened, to separately detect a shoulder webbing and a lap webbing of the seat belt, and to determine whether the seat belt is worn normally or abnormally based on the detected result to warn that the seat belt is abnormally worn;
- wherein the controller is configured to individually detect the shoulder webbing and the lap webbing in a shoulder webbing area and a lap webbing area when a motion of the occupant's hand satisfies a misuse condition of the shoulder webbing or the lap webbing after the seat belt is normally fastened, whereby the occupant and the shoulder and lap webbings are detected.

12. The system of claim 11, wherein the misuse condition of the shoulder webbing is satisfied when the occupant's hand is raised over a shoulder or the shoulder webbing passes the occupant's face covering the face.

13. The system of claim 11, wherein the misuse condition of the lap webbing is satisfied when the occupant's hand passes after staying around the lap webbing within a specific time range.

14. A system for detecting misuse of a seat belt, the system comprising:
- a sensor unit configured to detect an occupant seated on a seat and the seat belt; and
- a controller configured to detect the occupant based on an image signal detected through the sensor unit while the seat belt is fastened, to separately detect a shoulder webbing and a lap webbing of the seat belt, and to determine whether the seat belt is worn normally or abnormally based on the detected result to warn that the seat belt is abnormally worn;
- wherein the controller is configured to determine that the seat belt is fastened on an empty seat when no occupant is detected, and the shoulder webbing or the lap webbing is detected.

15. The system of claim 14, wherein whether a door is open is determined to detect the shoulder webbing and the lap webbing until the door is opened when it is determined that the seat belt is fastened on the empty seat.

16. A system for detecting misuse of a seat belt, the system comprising:
- a sensor unit configured to detect an occupant seated on a seat and the seat belt; and
- a controller configured to detect the occupant based on an image signal detected through the sensor unit while the seat belt is fastened, to separately detect a shoulder webbing and a lap webbing of the seat belt, and to determine whether the seat belt is worn normally or abnormally based on the detected result to warn that the seat belt is abnormally worn;
- wherein the controller is configured to determine that the occupant is seated on the seat belt or the seat belt is fastened behind the seat abnormally, and to output a warning when the occupant is detected and neither the shoulder webbing nor the lap webbing is detected after it is determined that the seat belt is fastened on an empty seat with no occupant thereon.

17. A method of detecting misuse of a seat belt, comprising:
- detecting, by a sensor unit, an occupant seated on a seat and the seat belt;
- detecting, by a controller, the occupant based on an image signal detected through the sensor unit while the seat belt is fastened;
- detecting, by the controller, a shoulder webbing and a lap webbing of the seat belt separately based on an image signal detected through the sensor unit while the seat belt is fastened;
- determining, by the controller, whether the seat belt is worn normally or abnormally based on the detection result in the detecting the occupant and the detecting the webbings; and
- outputting, by the controller, a warning that the seat belt is abnormally worn;
- wherein, in the determining step, it is determined that the seat belt is abnormally worn when the occupant is detected and neither the shoulder webbing nor the lap webbing is detected after it is determined that the seat belt is fastened on an empty seat with no occupant thereon.

18. The method of claim 17, wherein, in the determining step, the shoulder webbing and the lap webbing are individually detected in a shoulder webbing area and a lap webbing area to determine whether the seat belt is misused when a motion of an occupant's hand or a movement of the webbing satisfies a misuse condition of the shoulder webbing or the lap webbing after the seat belt is normally fastened whereby the occupant and the shoulder and lap webbings are detected.

* * * * *